US012625891B2

(12) United States Patent
Zhang

(10) Patent No.: US 12,625,891 B2
(45) Date of Patent: May 12, 2026

(54) DATA STORAGE METHOD AND APPARATUS, AND DATA READING METHOD AND APPARATUS

(71) Applicant: Alipay (Hangzhou) Information Technology Co., Ltd., Hangzhou (CN)

(72) Inventor: Da Zhang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 27 days.

(21) Appl. No.: 18/842,724

(22) PCT Filed: Jan. 6, 2023

(86) PCT No.: PCT/CN2023/071077
§ 371 (c)(1),
(2) Date: Aug. 29, 2024

(87) PCT Pub. No.: WO2023/165264
PCT Pub. Date: Sep. 7, 2023

(65) Prior Publication Data
US 2025/0217391 A1 Jul. 3, 2025

(30) Foreign Application Priority Data
Mar. 2, 2022 (CN) .......................... 202210197317.3

(51) Int. Cl.
*G06F 16/28* (2019.01)
*G06F 16/901* (2019.01)

(52) U.S. Cl.
CPC ........ *G06F 16/288* (2019.01); *G06F 16/9024* (2019.01)

(58) Field of Classification Search
CPC ........................... G06F 16/288; G06F 16/9024
See application file for complete search history.

(56) References Cited

U.S. PATENT DOCUMENTS

| | | | | |
|---|---|---|---|---|
| 6,151,327 A | * | 11/2000 | Sofman | ................... H04L 45/38 370/477 |
| 2012/0310916 A1 | * | 12/2012 | Abadi | ............... G06F 16/24542 707/E17.017 |

(Continued)

FOREIGN PATENT DOCUMENTS

| | | |
|---|---|---|
| CN | 109522428 A | 3/2019 |
| CN | 111208953 A | 5/2020 |

(Continued)

OTHER PUBLICATIONS

Xia et al., EP 3 537 296 A1, PCT/CN2017/112117, WO 2018/099299; Date of filing: Nov. 21, 2017 (Year: 2017).*

(Continued)

*Primary Examiner* — Mohsen Almani
(74) *Attorney, Agent, or Firm* — Womble Bond Dickinson (US) LLP

(57) ABSTRACT

Embodiments of this specification provide a data storage method and apparatus, and a data reading method and apparatus. The data storage method is applied to a knowledge graph platform, and includes: splitting target knowledge graph data, to determine at least two pieces of to-be-stored target subgraph data, where the target knowledge graph data include a target entity node and at least one edge associated with the target entity node, and each piece of to-be-stored target subgraph data includes the target entity node and an edge with at least one target attribute; and storing the at least two pieces of to-be-stored target subgraph data in at least two consecutive data blocks based on an edge attribute, where an end entity identifier of to-be-stored target subgraph data stored in a previous data block is the same as a start entity identifier of to-be-stored target subgraph data stored in a current data block.

18 Claims, 9 Drawing Sheets

Split target knowledge graph data, to determine at least two pieces of to-be-stored target subgraph data  ⟋ 102

Store the at least two pieces of to-be-stored target subgraph data in at least two consecutive data blocks based on an edge attribute  ⟋ 104

(56) References Cited

U.S. PATENT DOCUMENTS

| | | | | |
|---|---|---|---|---|
| 2017/0220703 | A1 | 8/2017 | Martha | |
| 2019/0244402 | A1* | 8/2019 | Hua | G06F 16/2465 |
| 2020/0167426 | A1 | 5/2020 | Scheideler et al. | |
| 2020/0226124 | A1* | 7/2020 | Chishti | G06F 16/9024 |
| 2022/0043675 | A1 | 2/2022 | Xia et al. | |
| 2023/0162009 | A1* | 5/2023 | Shin | G06N 3/045 |
| | | | | 706/25 |

FOREIGN PATENT DOCUMENTS

| | | |
|---|---|---|
| CN | 111859027 A | 10/2020 |
| CN | 114003775 A | 2/2022 |
| CN | 114048322 A | 2/2022 |
| CN | 114282073 A | 4/2022 |

OTHER PUBLICATIONS

Matam, Kiran Kumar, Hanieh Hashemi, and Murali Annavaram. "Multilogvc: efficient out-of-core graph processing framework for flash storage." 2021 IEEE International Parallel and Distributed Processing Symposium (IPDPS). IEEE, 2021. (Year: 2021).*

Cai, Jing, and Chung Keung Poon. "Path-hop: efficiently indexing large graphs for reachability queries." Proceedings of the 19th ACM international conference on Information and knowledge management. 2010. (Year: 2010).*

Cuzzocrea, Alfredo, et al. "Edge-based mining of frequent subgraphs from graph streams." Procedia Computer Science 60 (2015): 573-582. (Year: 2015).*

"International Search Report" for International Appl.No. PCT /CN2023/ 071077. Mailed on May 11, 2023, pp. 1-13.

"IP Office of Singapore: Search Report and Written Opinion" for Application No. 11202405386Y, Mailed on Feb. 10, 2026, pp. 1-10.

* cited by examiner

Receive a data reading request for target data, and determine a target storage location in index array information based on the data reading request          602

Read the target data from a target data block based on the target storage location          604

1

DATA STORAGE METHOD AND APPARATUS, AND DATA READING METHOD AND APPARATUS

This application is a national stage entry of international application no. PCT/CN2023/071077, filed Jan. 6, 2023, which claims priority to Chinese Patent Application No. 202210197317.3, filed with the China National Intellectual Property Administration on Mar. 2, 2022, and entitled "DATA STORAGE METHOD AND APPARATUS, DATA READING METHOD AND APPARATUS", which is incorporated here by reference in its entirety.

TECHNICAL FIELD

Embodiments of this specification relate to the field of computer technologies, and in particular, to a data storage method and a data reading method.

BACKGROUND

A knowledge graph is referred to as knowledge domain visualization or a knowledge domain mapping map in the library and information industry, is a series of different graphs that show a relationship between a knowledge development process and a structure, describes a knowledge resource and a carrier of the knowledge resource by using a visualization technology, and mines, analyzes, constructs, draws, and displays knowledge and a mutual relationship thereof.

Currently, there is no uniform standard for a storage structure design of the knowledge graph. For a graph whose data amount is not very large and whose structure is fixed, a conventional database and a relational table are usually used for storage. However, when a data amount is large, an entity usually includes many attributes. If these attributes are simultaneously computed and stored in a storage medium, efficiency of data computing, storage, and retrieval is greatly reduced.

SUMMARY

In view of this, this specification provides a data storage method and a data reading method. One or more embodiments of this specification relate to a data storage apparatus, a data reading apparatus, a computing device, a computer-readable storage media, and a computer program, to overcome a technical disadvantage in the conventional technology.

According to a first aspect of the embodiments of this specification, a data storage method is provided, applied to a knowledge graph platform, and including:

splitting target knowledge graph data, to determine at least two pieces of to-be-stored target subgraph data, where the target knowledge graph data include a target entity node and at least one edge associated with the target entity node, and each piece of to-be-stored target subgraph data includes the target entity node and an edge with at least one target attribute; and storing the at least two pieces of to-be-stored target subgraph data in at least two consecutive data blocks based on an edge attribute, where an end entity identifier of to-be-stored target subgraph data stored in a previous data block is the same as a start entity identifier of to-be-stored target subgraph data stored in a current data block.

2

According to a second aspect of the embodiments of this specification, a data storage apparatus is provided, applied to a knowledge graph platform, and including:

a graph splitting module, configured to split target knowledge graph data, to determine at least two pieces of to-be-stored target subgraph data, where the target knowledge graph data include a target entity node and at least one edge associated with the target entity node, and each piece of to-be-stored target subgraph data includes the target entity node and an edge with at least one target attribute; and a data storage module, configured to store the at least two pieces of to-be-stored target subgraph data in at least two consecutive data blocks based on an edge attribute, where an end entity identifier of to-be-stored target subgraph data stored in a previous data block is the same as a start entity identifier of to-be-stored target subgraph data stored in a current data block.

According to a third aspect of the embodiments of this specification, a data reading method is provided, applied to a knowledge graph platform, and including:

receiving a data reading request for target data, and determining a target storage location in index array information based on the data reading request, where the index array information is determined based on index information in each data block, and includes a start entity identifier, an end entity identifier, and an edge attribute condition associated with the end entity identifier that are of graph data stored in each data block; and reading the target data from a target data block based on the target storage location.

According to a fourth aspect of the embodiments of this specification, a data reading apparatus is provided, applied to a knowledge graph platform, and including:

a storage location determining module, configured to: receive a data reading request for target data, and determine a target storage location in index array information based on the data reading request, where the index array information is determined based on index information in each data block, and includes a start entity identifier, an end entity identifier, and an edge attribute condition associated with the end entity identifier that are of graph data stored in each data block; and a data reading module, configured to read the target data from a target data block based on the target storage location.

According to a fifth aspect of the embodiments of this specification, a computing device is provided, including:

a memory and a processor, where the memory is configured to store computer-executable instructions, the processor is configured to execute the computer-executable instructions, and when the computer-executable instructions are executed by the processor, steps of the above-mentioned method are implemented.

According to a sixth aspect of the embodiments of this specification, a computer-readable storage medium is provided. The computer-readable storage medium stores computer-executable instructions, and when the computer-executable instructions are executed by a processor, steps of the above-mentioned method are implemented.

According to a seventh aspect of the embodiments of this specification, a computer program is provided. When the computer program is executed in a computer, the computer is enabled to perform steps of the above-mentioned method.

In an embodiment of this specification, target knowledge graph data are split, to determine at least two pieces of to-be-stored target subgraph data, where the target knowledge graph data include a target entity node and at least one edge associated with the target entity node, and each piece of to-be-stored target subgraph data includes the target entity node and an edge with at least one target attribute; and the at least two pieces of to-be-stored target subgraph data are stored in at least two consecutive data blocks based on an edge attribute, where an end entity identifier of to-be-stored target subgraph data stored in a previous data block is the same as a start entity identifier of to-be-stored target subgraph data stored in a current data block.

Specifically, a constructed target knowledge graph is split, to determine at least two pieces of to-be-stored target subgraph data, and the at least two pieces of to-be-stored target subgraph data are stored in at least two consecutive data blocks based on an edge attribute, to resolve a problem that efficiency of storing a knowledge graph with a large data amount at one time is low. In addition, storage is performed after splitting, to improve storage performance of graph data, and help provide a fast retrieval and access capability for the graph data with a large data amount subsequently.

DESCRIPTION OF EMBODIMENTS

Figure 1:
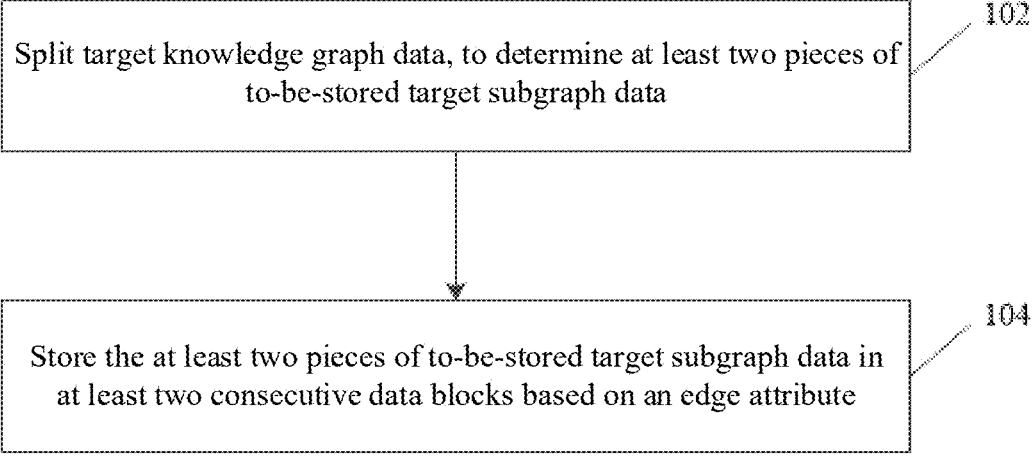
FIG. 1 is a flowchart illustrating a data storage method, according to an embodiment of this specification.

Many specific details are described in the following descriptions, to facilitate full understanding of this specification. However, this specification can be implemented in many manners different from those described here. A person skilled in the art can perform similar promotion without violating connotation of this specification. Therefore, this specification is not limited by specific implementations disclosed below.

Terms used in one or more embodiments of this specification are merely used to describe specific embodiments, and are not intended to limit the one or more embodiments of this specification. The terms "a", "said", and "the" of singular forms used in one or more embodiments of this specification and the appended claims are also intended to include plural forms, unless otherwise specified in the context clearly. It should also be understood that, the term "and/or" used in one or more embodiments of this specification indicates and includes any or all of possible combinations of one or more associated listed items.

It should be understood that although terms "first", "second", etc. may be used in one or more embodiments of this specification to describe various types of information, the information is not limited to these terms. These terms are only used to distinguish the same type of information from each other. For example, without departing from the scope of one or more embodiments of this specification, "first" can also be referred to as "second", and similarly, "second" can be referred to as "first". Depending on the context, for example, the word "if" used here can be explained as "while", "when", or "in response to determining".

First, noun terms used in one or more embodiments of this specification are explained.

A knowledge graph is referred to as knowledge domain visualization or a knowledge domain mapping map in the library and information industry, is a series of different graphs that show a relationship between a knowledge development process and a structure, describes a knowledge resource and a carrier of the knowledge resource by using a visualization technology, and mines, analyzes, constructs, draws, and displays knowledge and a mutual relationship thereof.

A onehop subgraph is a subgraph formed through onehop propagation from a vertex of a graph to an adjacent node.

Hotspot data are subgraph data that are of an edge connected to an entity node and whose data amount is greater than a preset threshold.

A hotspot subgraph is a onehop subgraph of hotspot data. In other words, a vertex has a large scale of out-edges or in-edges, and such a subgraph is a hotspot subgraph.

A B-tree (which is a multi-way search tree, and is not binary) is a common data structure. A structure of the B-tree can significantly reduce an intermediate process experienced when a record is located, thereby accelerating an access speed.

In a graph model, a data hotspot is a common problem, and a hotspot problem concerns storage and access performance of graph data. Usually, in a service scenario such as a transaction service, a merchant service, or a security service, there is a relatively large quantity of data hotspots, for example, transaction information of a user or user and feature labels. In such hotspot scenarios, a vertex has a large quantity of out-edges or in-edges. In a data storage method provided in an embodiment of this specification, graph data with a large data amount can be effectively organized and stored, and a fast access capability is provided for the data with a large data amount, to not only completely store picture data with a large data amount, but also provide a fast and random access capability, a sequential scanning capability, and a hotspot edge truncation capability for the data with a large data amount.

An embodiment of this specification further provides a graph storage solution in which K/V storage can be performed. Usually, a hotspot data problem is resolved in a multi-level storage manner. The hotspot data problem can be understood as knowledge graph data with a relatively large data amount. An embodiment of this specification can further provide a solution in which hotspot edge data are stored as "N" and "part" based on a B-tree, "part" is used as a node of the B-tree, and a corresponding "part" data block can be read by using a B-tree search mechanism during data access, to obtain edge information that needs to be searched for. It is worthwhile to note that, such a hotspot solution is suitable to be used as a hotspot solution to a graph database, and can implement fast and random access of a hotspot edge. However, a disadvantage is that a B-tree model has certain maintenance costs, enough buffer layers are needed to reduce random access to a bottom-layer file, there is no obvious advantage in scenarios of data analysis, rule-based reasoning, and batch loading of graph data on a knowledge graph data platform, and random access to a file is also increased, to deteriorate IO performance. Therefore, in a data storage method provided in an embodiment of this specification, no B-Tree is used to maintain storage of a plurality of parts obtained after hotspot data are split; instead, it is ensured that edges in a hotspot subgraph are sequentially stored, the hotspot subgraph is split into a plurality of data blocks for continuous storage, and hotspot edge information is recorded in meta (index record), to ensure that data blocks that store the hotspot data are continuously stored. In a scenario of sequentially reading graphs in batches, a file search operation is avoided, and performance is relatively high. In a scenario of randomly querying a graph, some variable data are quickly located and obtained by performing a binary search on the data blocks that store the hotspot data. Different from a graph database service, in the data storage method provided in this embodiment of this specification, a random query capability in a data analysis scenario is provided based on a layout file of graph data, without adding a data buffer layer or providing a low-delay online query response capability.

This specification provides a data storage method and a data reading method. This specification also relates to a data storage apparatus, a data reading apparatus, a computing device, a computer-readable storage medium, and a computer program. The data storage method, the data reading method, the data storage apparatus, the data reading apparatus, the computing device, the computer-readable storage medium, and the computer program are described in detail one by one in the following embodiments.

It is worthwhile to note that, the data storage method provided in the embodiments of this specification is applied to an intelligent knowledge graph platform. The intelligent knowledge graph platform can provide functions such as graph construction, graph data storage, and rule reasoning of graph data. The embodiments of this specification set no limitation on a specific intelligent knowledge graph platform. In addition, when the intelligent knowledge graph platform stores a subgraph data segment, the intelligent knowledge graph platform can store the subgraph data segment based on a previously constructed chain. For example, for a full event or transaction type data (which can be understood as K/V data), the K/V data are converted into a onehop subgraph (which can be understood as that a grouping operation is performed, an entity and a onehop neighbor of the entity form a onehop subgraph in a form of a vertex and an edge, and the onehop subgraph includes a vertex and a full out-edge/in-edge whose center is the vertex); data of the onehop subgraph are split, to form a plurality of onehop subgraph segments; and then the plurality of onehop subgraph segments are sequentially written to consecutive data blocks (if a splitting threshold is not reached, splitting is not performed).

FIG. 1 is a flowchart illustrating a data storage method, according to an embodiment of this specification. The following steps are specifically included.

Step 102: target knowledge graph data is split, to determine at least two pieces of to-be-stored target subgraph data.

The target knowledge graph data include a target entity node and at least one edge associated with the target entity node, and each piece of to-be-stored target subgraph data includes the target entity node and an edge with at least one target attribute.

In actual applications, to quickly store a large amount of knowledge graph data and provide a fast access capability for stored knowledge graph data, an intelligent knowledge graph platform first splits target knowledge graph data with a relatively large data amount into at least two pieces of to-be-stored target subgraph data. The target knowledge graph data not only include a target entity node in to-be-processed data, but also include at least one edge associated with the target entity node. The target entity node is one of a plurality of entity nodes of the to-be-processed data. For example, if the to-be-processed data are transaction data of a store A, the target entity node in the target knowledge graph data can be the store A, and an edge associated with the store A is transaction data related to the store A. It is worthwhile to note that, the target knowledge graph data can be understood as a onehop subgraph. A structure of the onehop subgraph includes one entity node and at least one edge associated with the node, and information specifically included in the onehop subgraph is an entity node, an entity type, an entity attribute, a target node of the edge, an edge type, and an edge attribute. The information included in the onehop subgraph is not specifically limited in this embodiment of this specification, and can further change with an actual application.

Further, the intelligent knowledge graph platform can further clean and process the to-be-processed data, to construct the target knowledge graph data. Specifically, constructing the target knowledge graph data based on the received to-be-processed data includes:

processing the received to-be-processed data, to determine target entity data in the to-be-processed data and relational data associated with the target entity data; and determining a data structure of the to-be-processed data based on the target entity data and the relational data, and constructing the target knowledge graph data based on the data structure.

In actual applications, after receiving the to-be-processed data, the intelligent knowledge graph platform can construct the target knowledge graph data based on the to-be-processed data; determine the target entity data in the to-be-processed data and the relational data associated with the target entity data, where the relational data associated with the target entity data can be understood as data that has an edge attribute relationship with the target entity data; determine a data structure of an overall graph of the to-be-processed data based on the target entity data and the relational data; and construct the target knowledge graph data of the to-be-processed data based on the data structure. The above-mentioned example is still used. The target entity data are data of the store A, and include an entity identifier A of the store A, and the relational data are transaction data with the store A. The target knowledge graph data are constructed based on the data of the store A and the transaction data with the store A. A larger amount of transaction data leads to a larger quantity of edges in the constructed target knowledge graph data.

It is worthwhile to note that, based on different application scenarios, different target entity data are determined after the to-be-processed data are processed, and correspondingly, determined relational data associated with the target entity data are also different. This is not specifically limited in this embodiment of this specification.

In the data storage method provided in this embodiment of this specification, the to-be-processed data are processed, to determine the target entity data and the relational data, and further construct the target knowledge graph data of the to-be-processed data, so that the target knowledge graph data are subsequently stored based on the graph data.

Specifically, the intelligent knowledge graph platform can split the target knowledge graph data based on a preset splitting parameter. Specifically, splitting the target knowledge graph data, to determine at least two pieces of to-be-stored target subgraph data includes:

determining the splitting parameter, and splitting the target knowledge graph data based on the splitting parameter, to determine the at least two pieces of to-be-stored target subgraph data.

The splitting parameter can be understood as a quantity threshold parameter that is of edges in the split graph data and that is preconfigured on the intelligent knowledge graph platform. For example, the splitting parameter can be 100, 500, or 1000. It is worthwhile to note that, in the data storage method provided in this embodiment of this specification, different splitting parameters can be determined based on different quantities that are of edges in the target knowledge graph data and that are determined based on different application scenarios.

In actual applications, the intelligent knowledge graph platform can determine the splitting parameter based on a data amount of current target knowledge graph data; and split the target knowledge graph data based on the splitting parameter, to determine at least two pieces of to-be-stored target subgraph data. For example, if the splitting parameter determined by the intelligent knowledge graph platform is 100, edges in the target knowledge graph data are split based on the splitting parameter of 100. If there are 450 edges in the target knowledge graph data, quantities of edges in all pieces of to-be-stored target subgraph data after splitting are respectively 100, 100, 100, 100, and 50.

Figure 2:
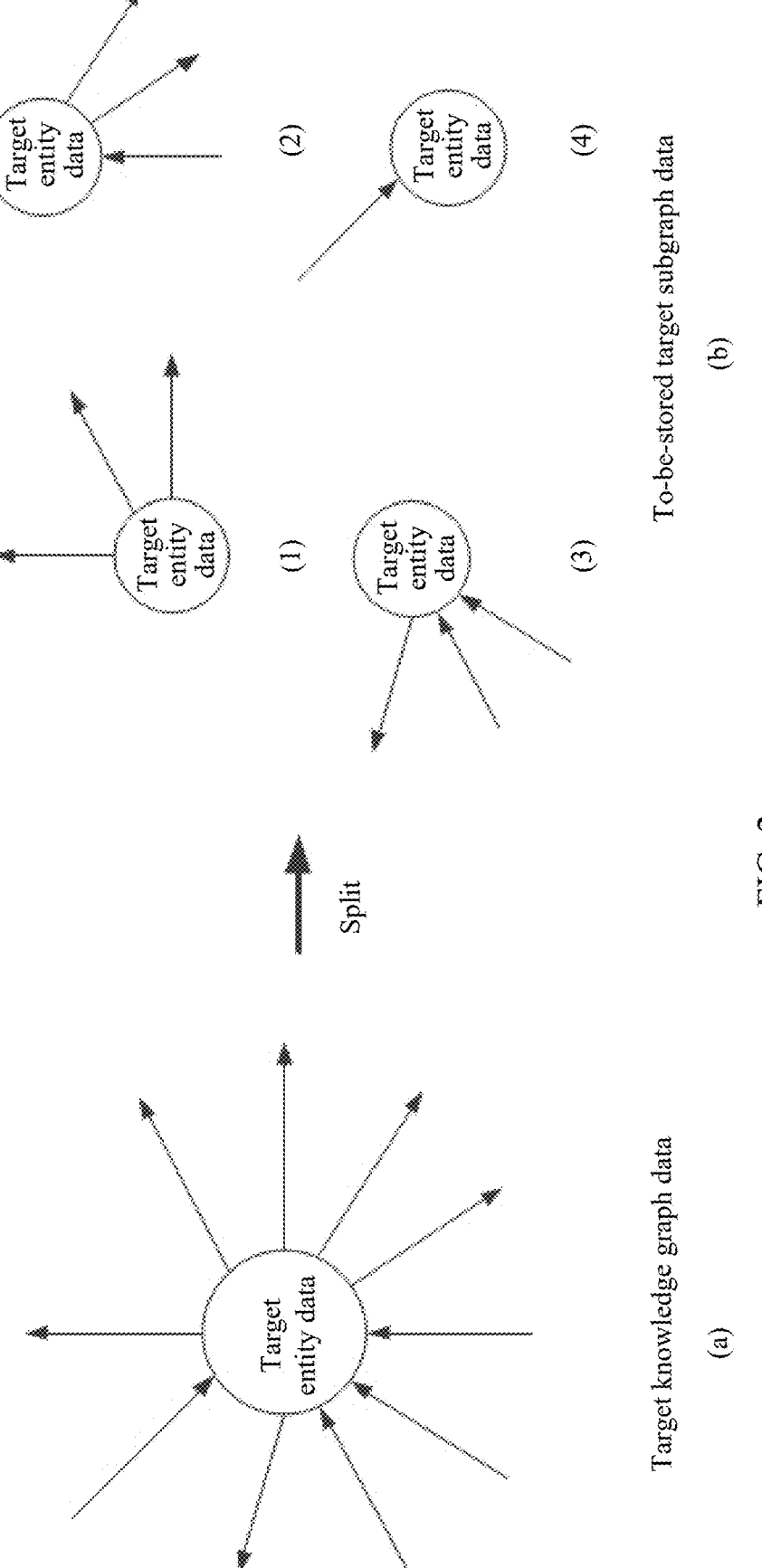
FIG. 2 is a schematic diagram illustrating a structure in which target knowledge graph data are split into at least two pieces of to-be-stored target subgraph data in a data storage method, according to an embodiment of this specification.

FIG. 2 is a schematic diagram illustrating a structure in which target knowledge graph data are split into at least two pieces of to-be-stored target subgraph data in a data storage method, according to an embodiment of this specification.

(a) in FIG. 2 is a schematic diagram illustrating a structure of target knowledge graph data. (b) in FIG. 2 is a schematic diagram illustrating a structure of to-be-stored target subgraph data. The target knowledge graph data include one piece of target entity data and 10 pieces of edge data connected to the target entity data. After the target knowledge graph data are split based on a preset splitting parameter of 3, four pieces of to-be-stored target subgraph data can be obtained, and are respectively shown in (1), (2), (3), and (4) in (b) in FIG. 2. All to-be-stored target subgraph data have the same target entity data, and have data edges corresponding to the splitting parameter. If to-be-stored target subgraph data to be split finally cannot satisfy the splitting parameter, a remaining data edge can be used for the last to-be-stored target subgraph data, for example, (4) in (b) in FIG. 2. It is worthwhile to note that, FIG. 2 is only a diagram illustrating an example in which target knowledge graph data are split and then stored. In actual applications, in different application scenarios, the edges in the target knowledge graph data have attribute data different from those of the data edge associated with the target entity data. Each edge can have an entity identifier of entity data corresponding to the target entity data, attribute data associated with the corresponding entity data, etc.

In the data storage method provided in this embodiment of this specification, after the target knowledge graph data are split, the at least two pieces of to-be-stored target subgraph data are obtained, so that the to-be-stored target subgraph data obtained after splitting are subsequently stored in a data block.

Step 104: the at least two pieces of to-be-stored target subgraph data is stored in at least two consecutive data blocks based on an edge attribute.

An end entity identifier of to-be-stored target subgraph data stored in a previous data block is the same as a start entity identifier of to-be-stored target subgraph data stored in a current data block.

The edge attribute can be understood as edge-based storage logic information of storing the at least two pieces of to-be-stored target subgraph data. Different from the edge attribute in the onehop subgraph, the edge attribute can be understood as edge-based sequential storage logic, for example, storing out-edge data and then storing in-edge data, performing classified storage on the out-edge data based on an edge type, and performing classified storage on the in-edge data based on an edge type.

In actual applications, to quickly store the large amount of knowledge graph data and provide the fast access capability for the stored knowledge graph data, the intelligent knowledge graph platform splits the target knowledge graph data with a relatively large data amount into the at least two pieces of to-be-stored target subgraph data, where each piece of to-be-stored target subgraph data includes the target entity node in the target knowledge graph data, and an edge in each piece of to-be-stored target subgraph data is an edge with at least one target attribute in the target knowledge graph data; and then stores the at least two pieces of to-be-stored target subgraph data in the at least two consecutive data blocks based on the edge attribute.

Further, after splitting the target knowledge graph data, the intelligent knowledge graph platform can store, in the data blocks in a preset sequence, the to-be-stored target subgraph data obtained after splitting. Specifically, storing the at least two pieces of to-be-stored target subgraph data in at least two consecutive data blocks based on an edge attribute includes:

determining an edge direction in the to-be-stored target subgraph data, and classifying edges in the to-be-stored target subgraph data based on the edge direction, to determine at least one edge type, where the edge direction includes an out-edge direction and an in-edge direction, the out-edge direction is a direction pointing from the target entity node to another entity node, and the in-edge direction is a direction pointing from another entity node to the target entity node; and storing the at least two pieces of to-be-stored target subgraph data in the at least two consecutive data blocks based on the at least one edge type.

The edge type can be understood as a type distinguished by a data attribute of the edge in the to-be-stored target subgraph data. For example, the data edge can be of a value type or a relational type. It is worthwhile to note that, this embodiment of this specification sets no limitation on the edge type.

The data block can be understood as a data storage block that stores the knowledge graph data, and each data block has fixed storage space. For example, storage space of one data block is 8M. This embodiment of this specification sets no limitation on the storage space of the data block.

In actual applications, the intelligent knowledge graph platform determines an edge direction in each piece of to-be-stored target subgraph data, where the edge direction includes an out-edge direction and an in-edge direction; classifies edges in the out-edge direction in the to-be-stored target subgraph data to determine at least one edge type; classifies edges in the in-edge direction in the to-be-stored target subgraph data to determine at least one edge type; and stores, in at least two consecutive data blocks based on each edge type, all to-be-stored target subgraph data obtained after splitting. The example in FIG. 2 is still used. There are three data edges in an out-edge direction in to-be-stored target subgraph data numbered (1), and there are zero data edges in an in-edge direction; there are two data edges in an out-edge direction in to-be-stored target subgraph data numbered (2), and there is one data edge in an in-edge direction; there is one data edge in an out-edge direction in to-be-stored target subgraph data numbered (3), and there are two data edges in an in-edge direction; and there are zero data edges in an out-edge direction in to-be-stored target subgraph data numbered (4), and there is one data edge in an in-edge direction. In this case, each piece of to-be-stored target subgraph data is stored in a sequence in an out-edge direction, and is then stored in a sequence in an in-edge direction. It is worthwhile to note that, a storage sequence provided in this embodiment of this specification is storing data in an out-edge direction and then storing data in an in-edge direction, but is not specifically limited.

Figure 3:
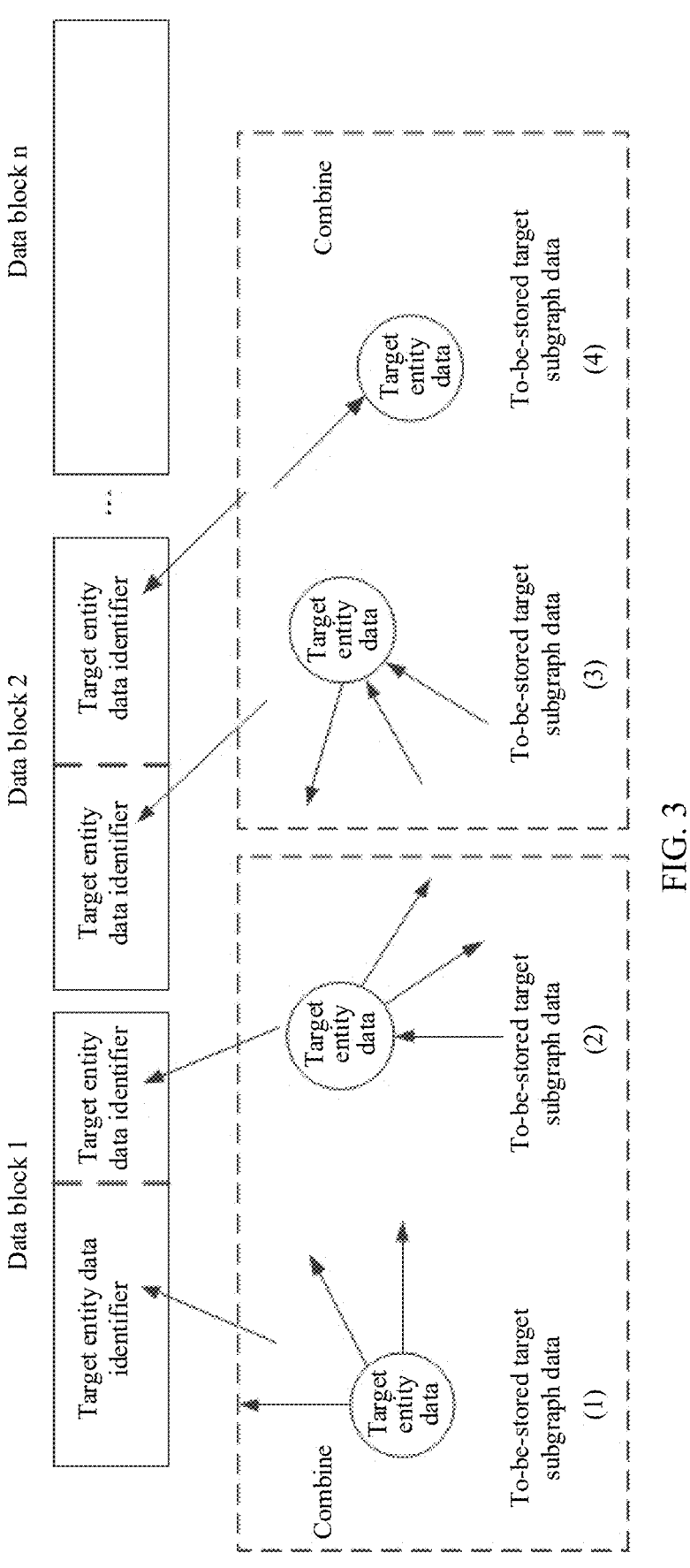
FIG. 3 is a schematic diagram illustrating a structure in which to-be-stored target subgraph data are stored in at least two consecutive data blocks in a data storage method, according to an embodiment of this specification.

FIG. 3 is a schematic diagram illustrating a structure in which to-be-stored target subgraph data are stored in at least two consecutive data blocks in a data storage method, according to an embodiment of this specification.

In FIG. 3, the data blocks can be a data block 1, a data block 2, . . . , and a data block n. A quantity of data blocks is not specifically limited in this embodiment. Data numbered (1) to (4) in FIG. 3 are to-be-stored target subgraph data. In actual applications, the intelligent knowledge graph platform stores the four pieces of to-be-stored target subgraph data obtained after splitting in at least two consecutive data blocks. It can be learned from FIG. 3 that, the to-be-stored target subgraph data (1) is stored in the data block 1, the to-be-stored target subgraph data (2) is stored in the data block 1, the to-be-stored target subgraph data (3) is stored in the data block 2, and the to-be-stored target subgraph data (4) is stored in the data block 2. It is worthwhile to note that, when the to-be-stored target subgraph data are stored, the to-be-stored target subgraph data are sequentially stored in consecutive data blocks. When remaining storage space of the data block 1 cannot store a next piece of to-be-stored target subgraph data, the next piece of to-be-stored target subgraph data is stored in the data block 2. In addition, after each piece of to-be-stored target subgraph data is classified based on an edge direction and an edge attribute in each direction, the to-be-stored target subgraph data are sequentially stored in a data block.

In addition, as shown in FIG. 3, in a process of writing at least two pieces of to-be-stored target subgraph data into the same data block (a process of writing the to-be-stored target subgraph data (1) and the to-be-stored target subgraph data (2) into the data block 1), at least two pieces of to-be-stored target subgraph data that have the same target entity data need to be combined. It can be understood as: Same target entity data in all pieces of to-be-stored target subgraph data are combined into one target entity data block, and written to a data block, to ensure that there is one entity data identifier in each type of entity data identifier in a single data block, avoid data writing repetition, improve data storage efficiency, and save storage space of the data block.

In the data storage method provided in this embodiment of this specification, the edge direction and the edge type in the to-be-stored target subgraph data are determined, to sequentially store the to-be-stored target subgraph data in the data block, thereby ensuring that target knowledge graph data with a large data amount are stored sequentially.

In addition, in the data storage method provided in this embodiment of this specification, the data block further includes a buffer, configured to store remaining data in the to-be-stored target subgraph data. Specifically, the data block further includes the buffer.

Correspondingly, storing the at least two pieces of to-be-stored target subgraph data in at least two consecutive data blocks based on the edge attribute includes:

determining, from the to-be-stored target subgraph data, remaining data that cannot be stored in the at least two consecutive data blocks, and storing the remaining data in a buffer in an end data block in the at least two consecutive data blocks.

The remaining data can be understood as remaining data that cannot be all stored in the same data block in the to-be-stored target subgraph data. For example, if a data amount of the to-be-stored target subgraph data is 5M, 4M data in the to-be-stored target subgraph data are stored in the data block, and 1M data are not stored, so that the remaining 1M data can be understood as remaining data.

In actual applications, a plurality of pieces of to-be-stored target subgraph data can be stored in the same data block. When the plurality of pieces of to-be-stored target subgraph data are written to the data block in a storage sequence, if the last to-be-stored target subgraph data to be written to the data block cannot be all stored in the data block, and there are some remaining data, the remaining data can be stored in a buffer in the data block, to ensure that the last to-be-stored target subgraph data can be stored in the same data block. In addition, when the at least two pieces of to-be-stored target subgraph data can be stored by occupying the at least two consecutive data blocks, a buffer can be provided in each data block, to resolve a problem that most data in to-be-stored target subgraph data are stored in a current data block, and a small amount of remaining data cannot be stored in the data block. The buffer is provided, so that the remaining data can be stored in the same data block as the most data in the to-be-stored target subgraph data.

Figure 4:
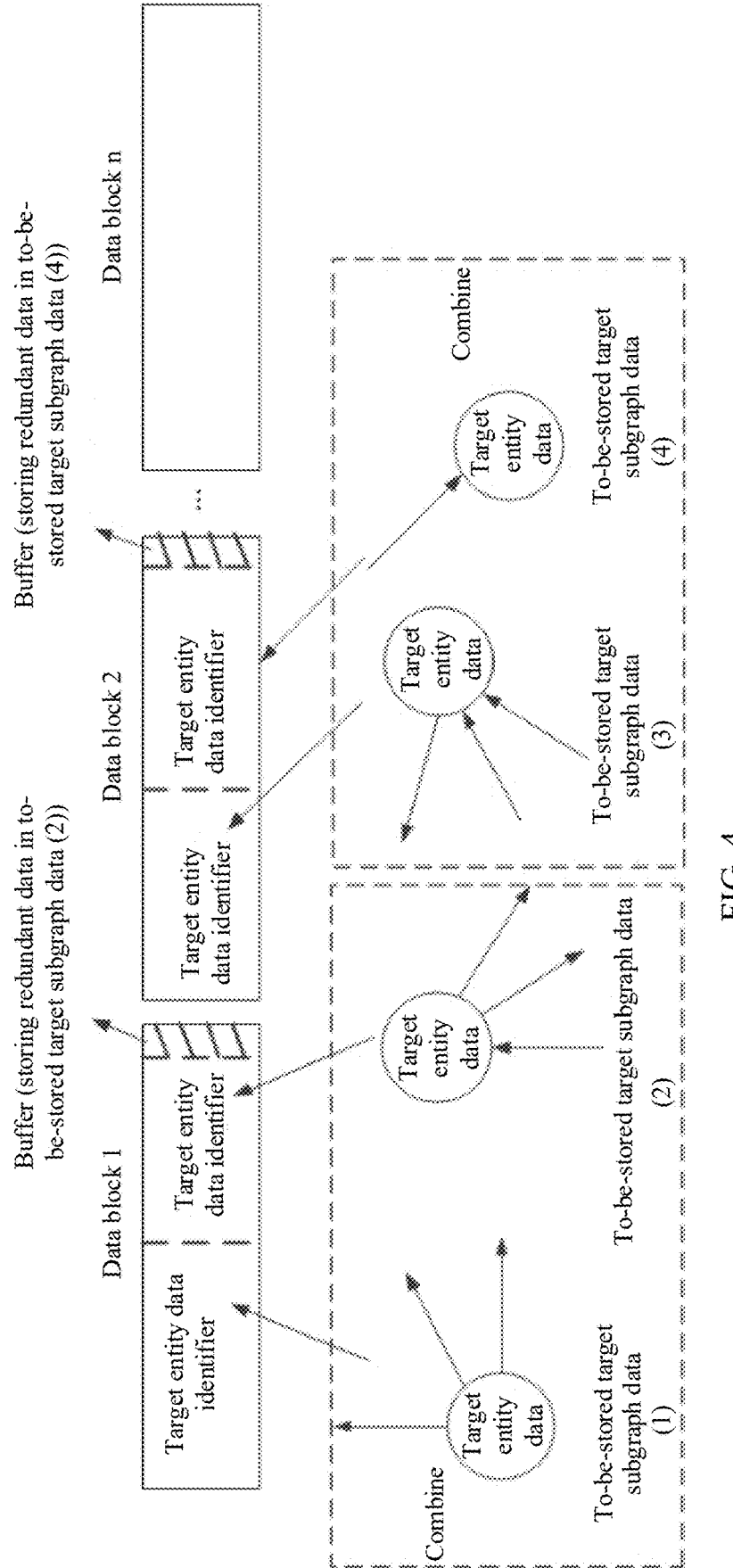
FIG. 4 is a schematic diagram illustrating a structure in which to-be-stored target subgraph data are stored in buffers in at least two consecutive data blocks in a data storage method, according to an embodiment of this specification.

FIG. 4 is a schematic diagram illustrating a structure in which to-be-stored target subgraph data are stored in buffers in at least two consecutive data blocks in a data storage method, according to an embodiment of this specification.

It is worthwhile to note that, in FIG. 4, when the last to-be-stored target subgraph data to be written to each data block cannot be all stored in a current data block, a remaining data processing manner is generated. In this embodiment of this specification, at least two pieces of to-be-stored target subgraph data obtained after the same target knowledge graph data are split can be continuously stored in a data block, and a storage application of the buffer can be applied to each data block or can be applied at an end of sequentially storing all to-be-stored target subgraph data. This is not limited in this embodiment of this specification.

In FIG. 4, that four pieces of to-be-stored target subgraph data (1), (2), (3), and (4) are stored in two consecutive data blocks is used as an example for description. For the two consecutive data blocks, references can be made to a data block 1 and a data block 2 in FIG. 4. In actual applications, after the to-be-stored target subgraph data (1) are stored in the data block 1, remaining space of the data block 1 can store the to-be-stored target subgraph data (2). When a small amount of remaining data in the to-be-stored target subgraph data (2) cannot be stored in the remaining space of the current data block, a buffer in the data block 1 can be occupied, and the small amount of remaining data are stored in the buffer in the data block 1. It is worthwhile to note that, a size of the determined remaining data is certainly less than that of reserved storage space of the buffer. It can also be understood that, the buffer can be started for data storage only if a remaining data can be all stored in the buffer in the data block; or if only a part of a remaining data can be stored in the buffer, the buffer is not started for storage, and the to-be-stored target subgraph data can be directly stored in the next data block 2.

Correspondingly, the to-be-stored target subgraph data (4) in FIG. 4 and the to-be-stored target subgraph data (2) have a consistent remaining data storage mechanism. Details are omitted here for simplicity.

It is worthwhile to note that, for a process of combining to-be-stored target subgraph data in the same data block in FIG. 4, references can be made to descriptions of combination processing in FIG. 3. Details are omitted here for simplicity.

In the data storage method provided in this embodiment of this specification, the buffer is provided in the data block, so that when a size of remaining data in the to-be-stored target subgraph data is less than a preset data amount of the buffer, it is ensured that the same to-be-stored target subgraph data can be stored in the same data block, to implement data storage integrity.

In addition, after the to-be-stored target subgraph data are stored in the two consecutive data blocks, index data can be further recorded in each data block, so that a fast access capability for knowledge graph data can be subsequently implemented based on a record of the index data. Specifically, after storing the at least two pieces of to-be-stored target subgraph data in at least two consecutive data blocks based on an edge attribute, the method further includes:

recording index information in each data block, and determining index array information based on the index information in each data block, where the index information includes a start entity identifier, an end entity identifier, and an edge attribute condition associated with the end entity identifier that are of to-be-stored target subgraph data stored in each data block.

The index array information can be understood as information about an index group obtained after index information recorded in each data block is chained. For example, the index information in each data block is abstracted into index information in one chained block, and abstracted index data can be understood as the index array information.

In actual applications, the intelligent knowledge graph platform records corresponding index information for stored data in each data block. The index information includes a start entity identifier of the first to-be-stored target subgraph data stored in a current data block, an end entity identifier of the last to-be-stored target subgraph data stored at an end of the current data block, and an edge attribute condition associated with the end entity identifier. The edge attribute condition associated with the end entity identifier can be understood as an edge direction and an edge type in the last to-be-stored target subgraph data stored in the current data block. For example, index information recorded in the data block 1 is vid=1, vid=3, an out-edge direction, and a transaction data type. Here, vid represents an entity identifier of to-be-stored target subgraph data.

It is worthwhile to note that, the index information can be understood as meta data, and "meta" is a storage file similar to csv. One row of data describes one data block, and there are a total of seven fields: vertexType (entity data type), startVertexId (start entity data identifier), end VertexId (end entity data identifier), filename (file name), blockIndex (data block index information), edgeMode (a direction of the last edge in end entity data), and edgeType (a type of the last edge in the end entity data). In addition, the index information merely shows an example of storage, and indicates information recorded in the meta data and an arrangement of the meta data. However, to reduce remaining storage, some storage optimization can be performed when a file is stored, and data actually written to a disk may have a format different from the above-mentioned format. This is not specifically limited in this embodiment of this specification.

In the data storage method provided in this embodiment of this specification, the index information in each data block is recorded, and the index information in each data block is abstracted, to determine the index array information, so that the to-be-stored target subgraph data that is to be accessed is quickly searched for based on the index array information.

Further, format conversion is performed based on the index information recorded in each data block, to construct the index array information. Specifically, determining the index array information based on the index information in each data block includes:

determining the start entity identifier and the end entity identifier of the to-be-stored target subgraph data in each data block; and in a case where it is determined that an end entity identifier and a start entity identifier that are adjacent in two consecutive data blocks are the same, processing index information in the two consecutive data blocks, to determine index array information, where entity identifiers in the index array information are arranged based on a storage sequence.

In actual applications, the knowledge graph data platform can first determine start entity identifiers and end entity identifiers of all to-be-stored target subgraph data stored in each data block, where the start entity identifier can be understood as an identifier of target entity data in the first to-be-stored target subgraph data stored in a current data block, and the end entity identifier can be understood as an identifier of end entity data in the last to-be-stored target subgraph data stored in the current data block; and after the start entity identifier and the end entity identifier are determined in each data block, it is necessary to determine whether an end entity identifier and a start entity identifier in two consecutive data blocks are the same. If the start entity identifier and the end entity identifier are the same, it indicates that target entity data in to-be-stored target subgraph data stored in current two consecutive data blocks are consistent. Therefore, it can be understood that all to-be-stored target subgraph data stored in the current two consecutive data blocks are obtained through splitting from the same target knowledge graph data. In the data storage method provided in this embodiment of this specification, index data of data blocks stored in the same target knowledge graph data are abstracted and combined into one piece of index array data, and the abstracted index array data have the same storage mechanism as the data block.

Figures 5, 6:
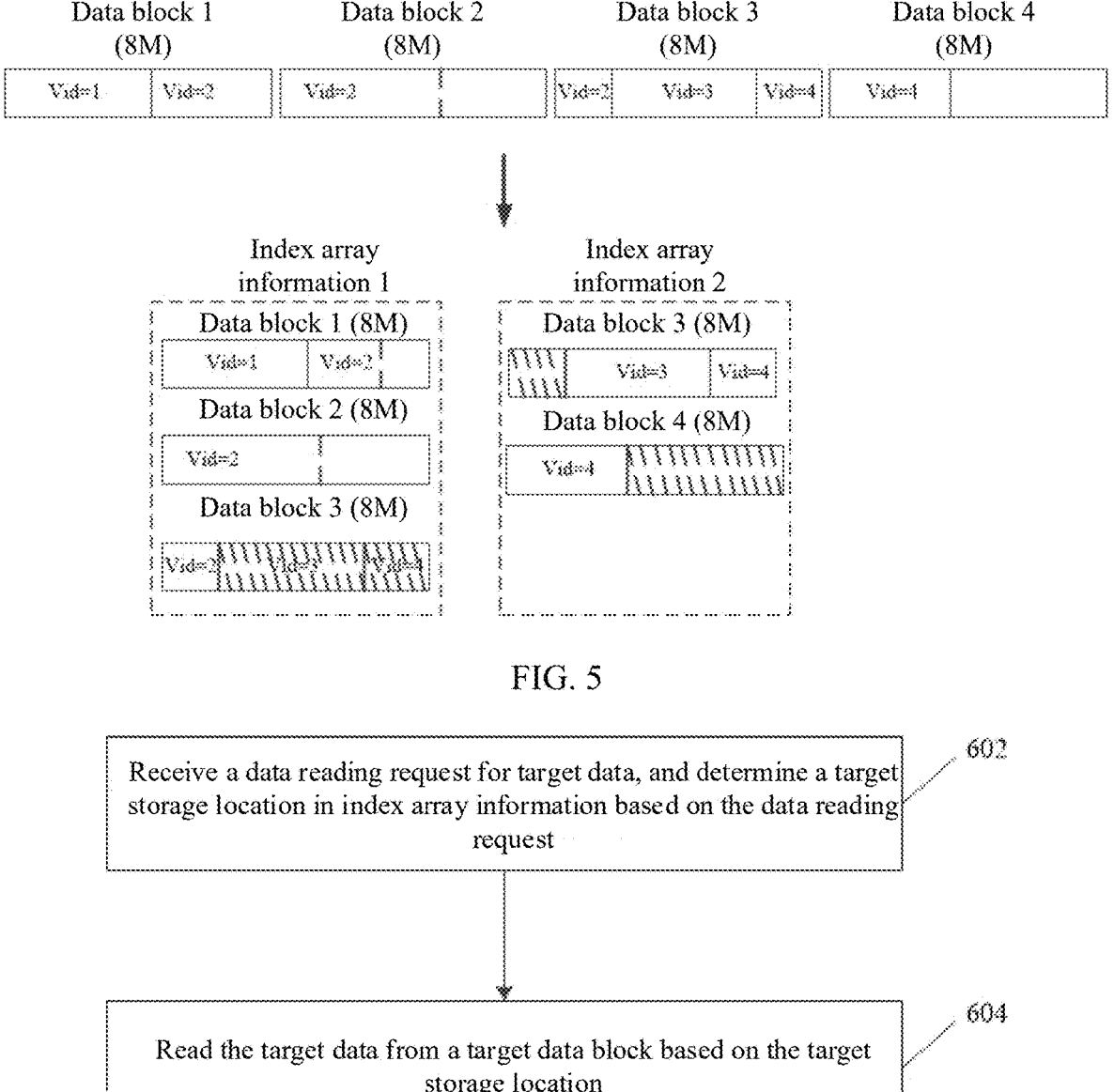
FIG. 5 is a schematic diagram illustrating an index array information generation manner in a data storage method, according to an embodiment of this specification.
FIG. 6 is a flowchart illustrating a data reading method, according to an embodiment of this specification.

FIG. 5 is a schematic diagram illustrating an index array information generation manner in a data storage method, according to an embodiment of this specification.

An upper half part in FIG. 5 shows that four data blocks store to-be-stored target subgraph data. A data block 1 (8M) stores to-be-stored target subgraph data (vid=1) whose target entity data identifier is 1 and to-be-stored target subgraph data (vid=2) whose target entity data identifier is 2. A data block 2 (8M) stores to-be-stored target subgraph data (vid=2) whose target entity data identifier is 2. A dashed boundary in the data block 2 represents that there are two pieces of to-be-stored target subgraph data with vid=2. A data block 3 (8M) stores to-be- stored target subgraph data (vid=2) whose target entity data identifier is 2, to-be-stored target subgraph data (vid=3) whose target entity data identifier is 3, and to-be-stored target subgraph data (vid=4) whose target entity data identifier is 4. A data block 4 (8M) stores to-be-stored target subgraph data (vid=4) whose target entity data identifier is 4. A lower half part is a schematic diagram of index array information 1 and index array information 2 that are abstracted. The index array information 1 includes the data block 1, the data block 2, and the data block 3, and the index array information 2 includes the data block 3 and the data block 4. In the index array information 1, each data block stores to-be-stored target subgraph data whose target entity data identifier is 2. In actual applications, when an abstracted chain to index array information is established, a target entity identifier of the first to-be-stored target subgraph data in each data block and a target entity identifier of the last to-be-stored target subgraph data stored in the data block can be determined, and whether the target entity identifier of the first to-be-stored target subgraph data and the target entity identifier of the last to-be-stored target subgraph data are the same is determined, to chain data blocks. It is worthwhile to note that, chaining data blocks in the index array information is not physically chaining storage media, but is abstracted into a process of logically chaining the index information in each data block, so that a fast data access capability is subsequently implemented based on the chained index array information, and index information in a data block that stores data with the same target entity identifier in the index array information 1 is stored in the same index array information.

Further, the index array information 2 includes the data block 3 and the data block 4, because an end entity identifier in the data block 3 is vid=4, and a start entity identifier in the data block 4 is vid=4. Therefore, index record information in the data block 3 and index record information in the data block 4 are chained to the index array information 2.

It is worthwhile to note that, a slash part in a data block in FIG. 5 is index data repeatedly stored in the two pieces of index array information, and access can be ignored in the index array information in a subsequent data access process, thereby avoiding a waste of computing resources caused by repeated access.

In the data storage method provided in this embodiment of this specification, the to-be-stored target subgraph data obtained after splitting are logically aggregated into a complete subgraph, the index information recorded in each data block is processed to generate the index array information, so that the corresponding to-be-stored target subgraph data can be quickly searched for subsequently based on the index array information.

In addition, after target knowledge graph data are split and then stored, to-be-stored target subgraph data obtained after the splitting can be further read. In other words, the to-be-stored target subgraph data can be queried based on recorded index array information. FIG. 6 is a flowchart illustrating a data reading method, according to an embodiment of this specification. The following steps are specifically included.

Step 602: A data reading request for target data is received, and a target storage location in the index array information is determined based on the data reading request.

The index array information is determined based on index information in each data block, and includes a start entity identifier, an end entity identifier, and an edge attribute condition associated with the end entity identifier that are of graph data stored in each data block.

Step 604: The target data from a target data block is read based on the target storage location.

The target storage location can be understood as a logical storage location at which the target data are stored in the data block. In other words, a physical storage address can be determined in the index array information based on the logical storage location. It is worthwhile to note that, a type of the target storage location is not limited in this embodiment of this specification.

In a specific implementation, when an intelligent knowledge graph platform receives a data reading request sent by a user for the target data, the intelligent knowledge graph platform can find the target storage location corresponding to the target data in the index array information based on the data reading request, and then read the corresponding data from the corresponding target data block based on the target storage location.

In the data reading method provided in this embodiment of this specification, the target storage location is determined in the index array information, so that a storage location at which the target data are specifically stored is quickly found at an index data level.

Further, in a process of randomly reading the to-be-stored target subgraph data, the to-be-stored target subgraph data can be further searched for and read based on a start entity identifier and an end entity identifier in an aggregated data block and based on a target entity data identifier. Specifically, receiving the data reading request for the target data, and determining the target storage location in the index array information based on the data reading request includes:

receiving the data reading request for the target data, where the data reading request carries an entity identifier and a data edge type of the target data; and searching the index array information based on the entity identifier and the data edge type of the target data, to determine the target storage location corresponding to the target data.

In actual applications, after receiving the data reading request sent by the user for the target data, the intelligent knowledge graph platform can search the index array information in a binary manner based on the entity identifier and the data edge type of the target data that are carried in the data reading request, to determine a storage address at which the entity identifier of the target data is stored, and further determine the target storage location at which the target data are stored. For example, for a product transaction amount of the user in a store A in a time period B, the data reading request is a product transaction amount reading request. The product transaction amount reading request carries an entity identifier "store A", and a data edge type is data in an in-edge direction. Then, index array information in which the entity identifier is "store A" can be searched for in at least two pieces of index array information in a binary manner, to determine one piece of target index array information, and product transaction amount data of the store A in the time period B continue to be searched for in the target index array information.

It is worthwhile to note that, in a process of storing the to-be-stored target subgraph data in the data block described in the above-mentioned embodiment, because the to-be-stored target subgraph data are stored in a sequence of target entity identifiers, for example, vid=1, vid=2, vid=3, . . . , and each piece of target entity data has a corresponding entity identifier, a corresponding target storage location can be determined in a binary manner in a subsequent data access process.

In the data reading method provided in this embodiment of this specification, the entity identifier and the data edge type in the target data are searched for in the index array information, to determine the target storage location, so as to reduce a search procedure of searching all storage media through traversing, and quickly search for the target storage location of the target data.

Still further, reading the target data from the target data block based on the target storage location includes:

determining the target data block in the at least two consecutive data blocks based on the target storage location; and reading the target data from the target data block based on an edge attribute condition carried in the data reading request.

In actual applications, after determining the target storage location corresponding to the target data in the index array information, the intelligent knowledge graph platform can determine, in the at least two consecutive data blocks based on the target storage location, the target data block that stores the target data, and then read the target data from the target data block based on an edge attribute condition carried in the data reading request. The edge attribute condition can be understood as an attribute type of a data edge in the to-be-stored target subgraph data, for example, a value type. Specifically, data of the value type can be read from the determined target data block, and are used as the target data.

Figure 7:
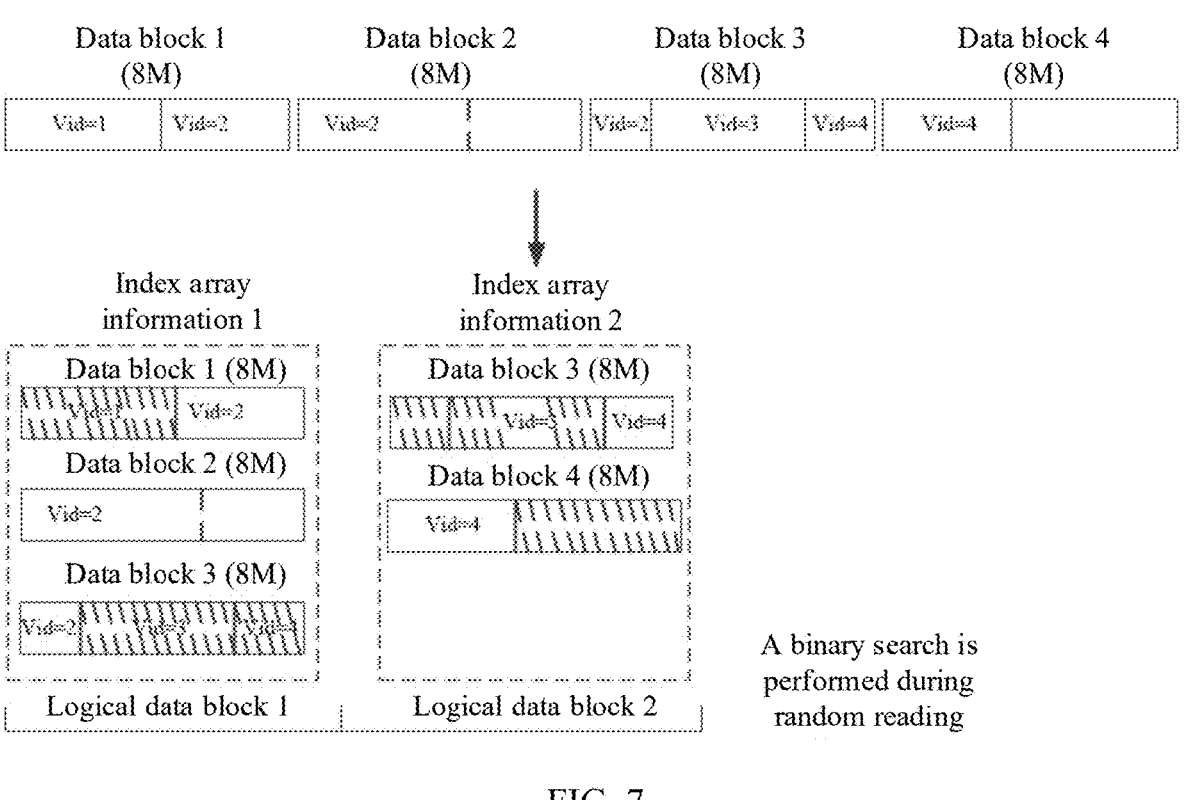
FIG. 7 is a schematic diagram illustrating a process of randomly reading data in a data reading method, according to an embodiment of this specification.

FIG. 7 is a schematic diagram illustrating a process of randomly reading data in a data reading method, according to an embodiment of this specification.

A specific schematic structure in FIG. 7 is the same as a schematic structure in FIG. 5, and is not repeatedly described here. However, index array information 1 in FIG. 7 can be considered as a logical data block 1, and index array information 2 can be considered as a logical data block 2. In a data reading process, in a case where it is determined that a target entity identifier of to-be-stored target subgraph data that are to be read is vid=2, it can be determined that a data search is performed in the index array information 1. Because the index data information 1 further stores index information of vid=1, vid=3, and vid=4, index information of data other than data whose target entity identifier is vid=2 can be ignored at a read layer (a part covered by slashes in the index array information 1 in FIG. 7). Data of vid=1 are stored in the data block 1, and are not stored across different data blocks. It can indicate that a data amount of the data of vid=1 is not large, and the data do not need to be split for storage (the data can be understood as non-hotspot data, but a current server does not perceive whether the data are hotspot data), and are read when the data of vid=1 need to be accessed in the index array information 1. Similarly, for data of vid=4, references can be made to the above-mentioned manner of reading data of vid=2. Details are omitted here for simplicity. In addition, when knowledge graph data (non-hotspot data) with a relatively small data amount and subgraph data that have a relatively large data amount and that are obtained after splitting exist in the same data block, for example, data of vid=3 and data of vid=4 exist in the index array information 2, remaining data in a previous data block (namely, data of vid=3) need to be skipped in a process of reading vid=4.

It is worthwhile to note that, a data reading process in the data reading method provided in this embodiment of this specification is implemented based on a data storage process described in the above-mentioned embodiment. In other words, in the data storage process, a fast data access capability is provided for a subsequent data search.

In the data reading method provided in this embodiment of this specification, the target data block that specifically stores the target data is determined based on the target storage location, so that a specific target data storage location is quickly determined based on index data, to avoid a case in which more data blocks need to be searched for through traversing, and consequently, unnecessary resource overheads are caused.

In addition, in the data reading method provided in this embodiment of this specification, a partition-based data reading capability can be further provided. Such an application scenario can be a distributed data reading scenario. Specifically, after the target storage location is determined in the index array information based on the data reading request, the method further includes:

partitioning the index array information based on a load balancing condition, to determine at least two data partitions; and correspondingly, after the at least two data partitions are determined, the method further includes:

receiving a partition-based data reading request sent by the user for the target data, and determining a target data partition based on partition index information carried in the partition-based data reading request; and reading the target data from the target data partition based on an entity identifier carried in the partition-based data reading request.

In actual applications, to implement a process of quickly reading data in a distributed scenario, reading is usually performed in a distributed and multi-task manner, and distributed graph computing and rule reasoning can be performed on read graph data. Aggregated index array information is partitioned. In each partition, one worker instance is responsible for data loading (edge truncation of a hotspot subgraph can also be implemented when a worker performs data loading). Further, in a partitioning process, a load balancing condition of each distributed server is considered, to avoid a problem that load is imbalanced because processing amounts of some servers are relatively large, and processing amounts of some servers are relatively small. After the index array information is partitioned into the at least two data partitions, and the partition-based data reading request sent by the user for the target data is received, the target data partition can be further determined based on the partition index information carried in the partition-based data reading request, and then the target data corresponding to the entity identifier carried in the partition-based data reading request is read based on the target data partition.

It is worthwhile to note that, in this embodiment of this specification, a partition-based computing formula can be further provided, to compute a data block index range [int startIndex, int endIndex] of a partition. To be specific, int startIndex=((workerIndex*blockCount+workerCount−1)/workerCount); and int endIndex=((workerIndex+1)*block-Count−1)/workerCount.

In the data reading method provided in this embodiment of this specification, in a distributed data reading scenario, the index array information can be partitioned, to satisfy a load balance in different instance processing processes, thereby quickly implementing a data access capability.

Figure 8:
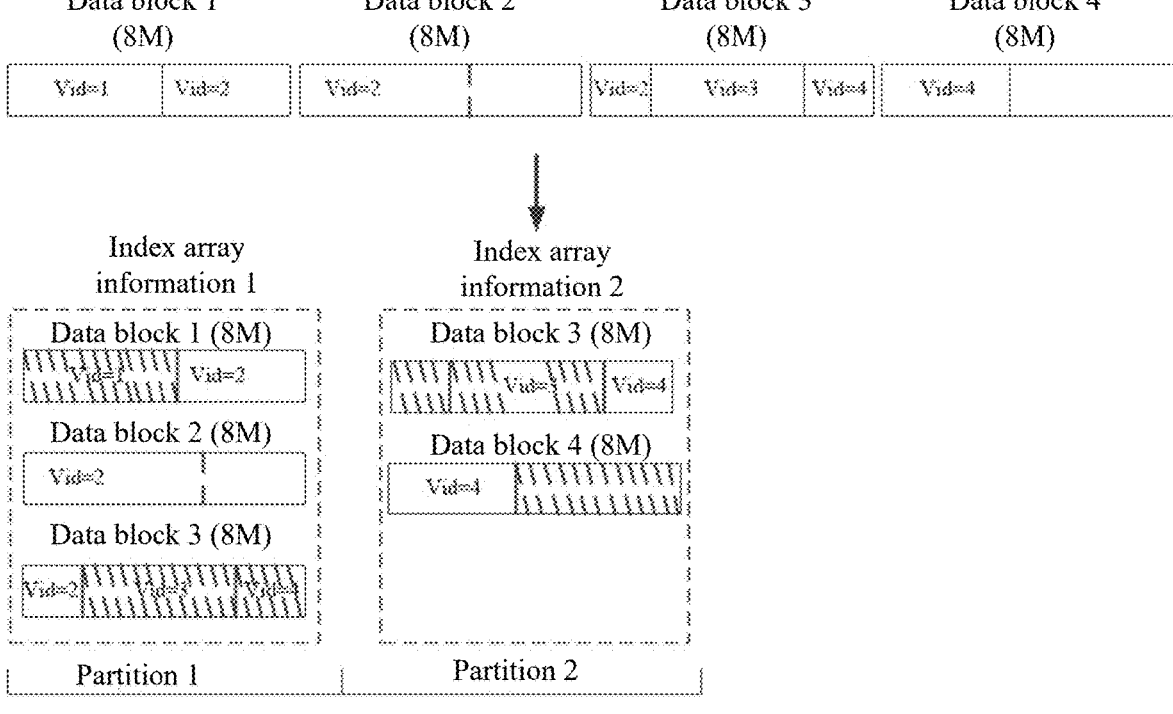
FIG. 8 is a schematic diagram illustrating a partition-based data reading process in a data reading method, according to an embodiment of this specification.

FIG. 8 is a schematic diagram illustrating a partition-based data reading process in a data reading method, according to an embodiment of this specification.

A specific schematic structure in FIG. 8 is the same as a schematic structure in FIG. 5, and is not repeatedly described here. However, index array information 1 in FIG. 8 can be partitioned into a partition 1, and index array information 2 can be partitioned into a partition 2. In this case, each partition can correspond to one distributed server, to obtain at least two pieces of index array information through partitioning when a load balance is satisfied. Specifically, determining can be based on an amount of index information in a data block stored in each piece of index array information, or an implementation can be in another manner. This is not specifically limited in this embodiment of this specification. In the data reading process, a storage partition of the target data can be determined, and then the target data block is determined based on the partition, to read the target data. A specific process is not described here.

In addition, in the data reading method provided in this embodiment of this specification, a onehop subgraph is sequentially stored in a data block based on the onehop subgraph. When the onehop subgraph is relatively large, the onehop subgraph is split into a plurality of small subgraphs on a write side, and is written at a plurality of times. In this case, a storage layer does not perceive existence of a hotspot. The data block usually has an approximately fixed size, and splitting of the block is triggered by a write operation. Usually, a onehop subgraph stored only in a single data block can be understood as non-hotspot data, and data with a relatively large data amount cannot be all stored in the single data block. To avoid a problem that the data with a large data amount are distributed in a plurality of folders for storage, and consequently, data in a single file are excessive, and it is difficult to implement data access, a onehop subgraph with a large data amount can be split for storage.

It is worthwhile to note that, a splitting constraint of the onehop subgraph with a large data amount is that: 1. Edges in the onehop subgraph with a large data amount are sequentially stored based on an out-edge type and an in-edge type. 2. Edges (out-edges or in-edges) of the same direction type in the onehop subgraph with a large data amount are lexicographically sorted and stored based on an edge type. 3. For the onehop subgraph with a large data amount, a subgraph obtained after splitting is vertex-split based on a size of the data block, subgraphs obtained after splitting are sequentially stored in N data blocks, and edges in a single subgraph obtained after splitting are also sequentially stored.

In addition, in a hotspot subgraph construction method, because a hotspot subgraph has a relatively large data amount, the hotspot subgraph can be stored across at least two data blocks, and such a type of data block can become a hotspot data block. A quantity of hotspot data blocks is linearly related to a scale of the hotspot subgraph. In a process of storing subgraphs obtained after splitting, the subgraph needs to be split in a sequence of an out-edge, an in-edge, and an edge type. The subgraph can be written sequentially from left to right after being obtained after splitting. A process of obtaining the subgraphs through splitting is executed in a chain for constructing hotspot data, and an SDK does not provide a splitting mechanism. Data blocks that store the hotspot subgraph are also consecutive, and this is ensured based on a case in which entity identifiers are globally sequential. That the entity identifiers are globally sequential can be that identifiers "vid" in a single data block are sequential, identifiers "vid" in data blocks in a single file are sequential, or identifiers "vid" in files are sequential. Hotspot data blocks with the same identifier "vid" are also consecutive, so that a fast_data access capability can be sequentially provided subsequently.

In conclusion, in the data reading method provided in this embodiment of this specification, existence of a hotspot needs to be weakened during storage, the hotspot is determined based on index information during access, whether to skip the hotspot is determined during random reading or batch reading, and a onehop subgraph is split and recombined, so that a onehop subgraph with a large data amount can be stored in a plurality of data blocks, and it is ensured that the subgraph is sequentially stored. Data blocks are sequentially stored, and hotspot information is recorded in the index information, to quickly locate required data from the hotspot data through a binary search. In addition, during data access, N hotspot data blocks are abstracted into a chained block (index array information), and a hotspot data storage model and a non-hotspot data storage model are unified, to ensure effective execution of mechanisms such as random reading and data block partitioning.

Figure 9:
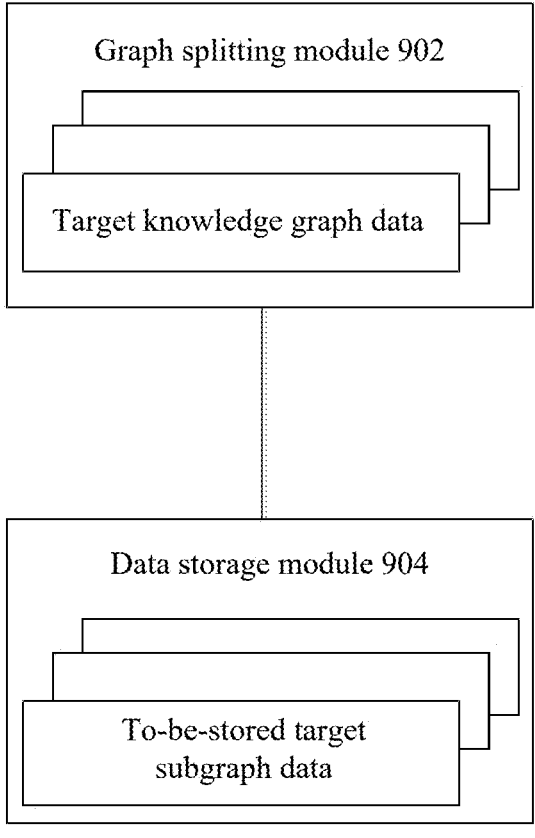
FIG. 9 is a schematic diagram illustrating a structure of a data storage apparatus, according to an embodiment of this specification.

Corresponding to the above-mentioned method embodiments, this specification further provides an embodiment of a data storage apparatus. FIG. 9 is a schematic diagram illustrating a structure of a data storage apparatus, according to an embodiment of this specification. As shown in FIG. 9, the apparatus includes:

a graph splitting module 902, configured to split target knowledge graph data, to determine at least two pieces of to-be-stored target subgraph data, where the target knowledge graph data include a target entity node and at least one edge associated with the target entity node, and each piece of to-be-stored target subgraph data includes the target entity node and an edge with at least one target attribute; and a data storage module 904, configured to store the at least two pieces of to-be-stored target subgraph data in at least two consecutive data blocks based on an edge attribute, where an end entity identifier of to-be-stored target subgraph data stored in a previous data block is the same as a start entity identifier of to-be-stored target subgraph data stored in a current data block.

Optionally, the apparatus further includes:

an index data information determining module, configured to: record index information in each data block, and determine index array information based on the index information in each data block, where the index information includes a start entity identifier, an end entity identifier, and an edge attribute condition associated with the end entity identifier that are of to-be-stored target subgraph data stored in each data block.

Optionally, the index data information determining module is further configured to:

determine the start entity identifier and the end entity identifier of the to-be-stored target subgraph data in each data block; and in a case where it is determined that an end entity identifier and a start entity identifier that are adjacent in two consecutive data blocks are the same, process index information in the two consecutive data blocks, to determine index array information, where entity identifiers in the index array information are arranged based on a storage sequence.

Optionally, the graph splitting module 902 is further configured to:

determine a splitting parameter, and split the target knowledge graph data based on the splitting parameter, to determine the at least two pieces of to-be-stored target subgraph data.

Optionally, the apparatus further includes:

a graph construction module, configured to: process received to-be-processed data, to determine target entity data in the to-be-processed data and relational data associated with the target entity data; and determine a data structure of the to-be-processed data based on the target entity data and the relational data, and construct the target knowledge graph data based on the data structure.

Optionally, the data storage module 904 is further configured to:

determine an edge direction in the to-be-stored target subgraph data, and classify edges in the to-be-stored target subgraph data based on the edge direction, to determine at least one edge type, where the edge direction includes an out-edge direction and an in-edge direction, the out-edge direction is a direction pointing from the target entity node to another entity node, and the in-edge direction is a direction pointing from another entity node to the target entity node; and store the at least two pieces of to-be-stored target subgraph data in the at least two consecutive data blocks based on the at least one edge type.

Optionally, the data block further includes a buffer.

Optionally, the data storage module 904 is further configured to:

determine, from the to-be-stored target subgraph data, remaining data that cannot be stored in the at least two consecutive data blocks, and store the remaining data in a buffer in an end data block in the at least two consecutive data blocks.

The data storage apparatus provided in this embodiment of this specification splits a constructed target knowledge graph, to determine at least two pieces of to-be-stored target subgraph data, and stores the at least two pieces of to-be-stored target subgraph data in at least two consecutive data blocks based on an edge attribute, to resolve a problem that efficiency of storing a knowledge graph with a large data amount at one time is low. In addition, storage is performed after splitting, to improve storage performance of graph data, and help provide a fast access capability for the graph data with a large data amount subsequently.

The above describes a schematic solution of the data storage apparatus in this embodiment. It is worthwhile to note that the technical solution of the data storage apparatus and the technical solution of the data storage method belong to the same concept. For detailed content not described in detail in the technical solution of the data storage apparatus, references can be made to descriptions of the technical solution of the data storage method.

Figure 10:
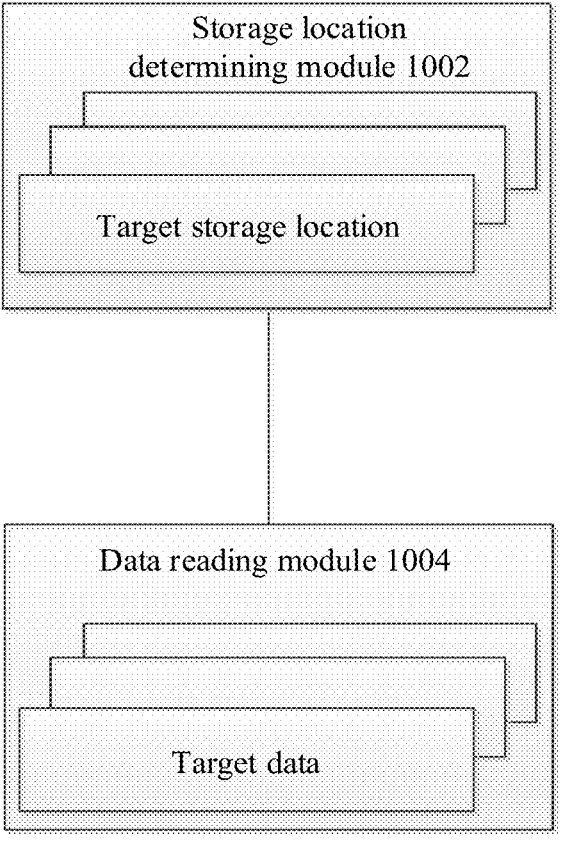
FIG. 10 is a schematic diagram illustrating a structure of a data reading apparatus, according to an embodiment of this specification.

Corresponding to the above-mentioned method embodiments, this specification further provides an embodiment of a data reading apparatus. FIG. 10 is a schematic diagram illustrating a structure of a data reading apparatus, according to an embodiment of this specification. As shown in FIG. 10, the apparatus is applied to a knowledge graph platform, and includes:

a storage location determining module 1002, configured to: receive a data reading request for target data, and determine a target storage location in index array information based on the data reading request, where the index array information is determined based on index information in each data block, and includes a start entity identifier, an end entity identifier, and an edge attribute condition associated with the end entity identifier that are of graph data stored in each data block; and a data reading module 1004, configured to read the target data from a target data block based on the target storage location.

Optionally, the storage location determining module 1002 is further configured to:

receive the data reading request for the target data, where the data reading request carries an entity identifier and a data edge type of the target data; and search the index array information based on the entity identifier and the data edge type of the target data, to determine the target storage location corresponding to the target data.

Optionally, the data reading module 1004 is further configured to:

determine the target data block in at least two consecutive data blocks based on the target storage location; and read the target data from the target data block based on an edge attribute condition carried in the data reading request.

Optionally, the apparatus further includes:

a partition determining module, configured to partition the index array information based on a load balancing condition, to determine at least two data partitions; and Optionally, the data reading module 1004 is further configured to:

receive a partition-based data reading request for the target data, and determine a target data partition based on partition index information carried in the partition-based data reading request; and read the target data from the target data partition based on an entity identifier carried in the partition-based data reading request.

The data reading apparatus provided in this embodiment of this specification needs to weaken existence of a hotspot during storage, determines the hotspot based on index information during access, determines, during random reading or batch reading, whether to skip the hotspot, and splits and recombines a onehop subgraph, so that a onehop subgraph with a large data amount can be stored in a plurality of data blocks, and it is ensured that the subgraph is sequentially stored. Data blocks are sequentially stored, and hotspot information is recorded in the index information, to quickly locate required data from the hotspot data through a binary search. In addition, during data access, N hotspot data blocks are abstracted into a chained block (index array information), and a hotspot data storage model and a non-hotspot data storage model are unified, to ensure effective execution of mechanisms such as random reading and data block partitioning.

The above describes a schematic solution of the data reading apparatus in this embodiment. It is worthwhile to note that the technical solution of the data reading apparatus and the technical solution of the data reading method belong to the same concept. For detailed content not described in detail in the technical solution of the data reading apparatus, references can be made to descriptions of the technical solution of the data reading method.

Figure 11:
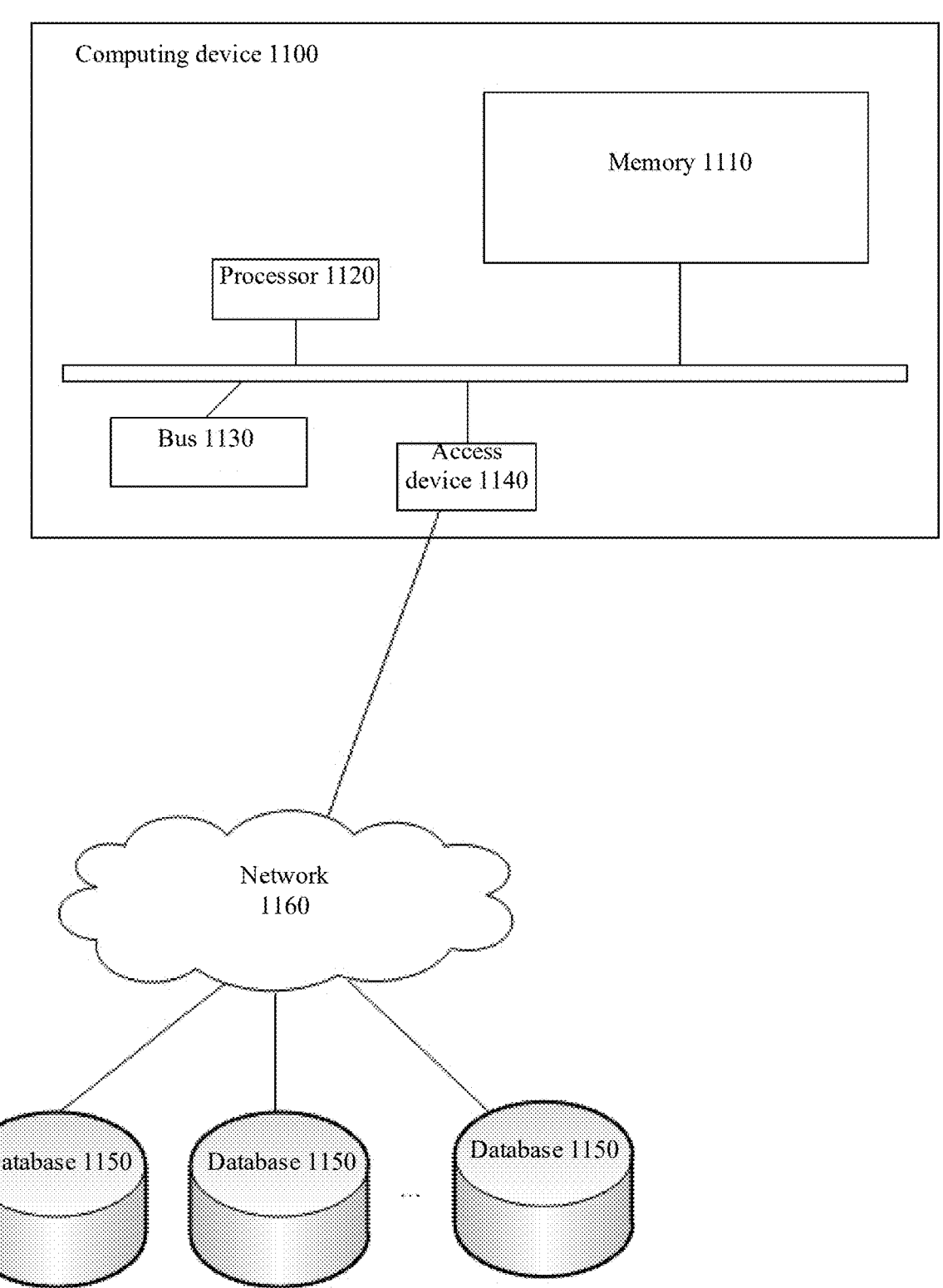
FIG. 11 is a block diagram illustrating a structure of a computing device, according to an embodiment of this specification.

FIG. 11 is a block diagram illustrating a structure of a computing device 1100, according to an embodiment of this specification. Components of the computing device 1100 include but are not limited to a memory 1110 and a processor 1120. The processor 1120 is connected to the memory 1110 through a bus 1130, and a database 1150 is configured to store data.

The computing device 1100 further includes an access device 1140, and the access device 1140 enables the computing device 1100 to communicate via one or more networks 1160. Examples of these networks include a public switched telephone network (PSTN), a local area network (LAN), a wide area network (WAN), a personal area network (PAN), or a combination of communications networks such as the Internet. The access device 1140 can include one or more of any types of wired or wireless network interfaces (for example, a network interface card (NIC)), for example, an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near field communication (NFC) interface.

In an embodiment of this specification, the components of the computing device 1100 and other components not shown in FIG. 11 can also be connected to each other, for example, through a bus. It should be understood that, the block diagram illustrating the structure of the computing device shown in FIG. 11 is merely for an example purpose, and is not a limitation on a scope of this specification. A person skilled in the art can add or replace other components based on a requirement.

The computing device 1100 can be any type of stationary or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), or other types of mobile devices, or a stationary computing device such as a desktop computer or a PC. The computing device 1100 can alternatively be a mobile or stationary server.

The processor 1120 is configured to execute the following computer-executable instructions. When the computer-executable instructions are executed by the processor, the steps of the above-mentioned methods are implemented.

The above describes a schematic solution of the computing device in this embodiment. It is worthwhile to note that the technical solution of the computing device and the technical solution of the above-mentioned method belong to the same concept. For detailed content not described in detail in the technical solution of the computing device, references can be made to the descriptions of the technical solution of the above-mentioned method.

An embodiment of this specification further provides a computer-readable storage medium. The computer-readable storage medium stores computer-executable instructions, and when the computer-executable instructions are executed by a processor, the steps of the above-mentioned method are implemented.

The above describes a schematic solution of the computer-readable storage medium in this embodiment. It is worthwhile to note that the technical solution of the storage medium and the technical solution of the above-mentioned method belong to the same concept. For detailed content not described in detail in the technical solution of the storage medium, references can be made to the descriptions of the technical solution of the above-mentioned method.

An embodiment of this specification further provides a computer program. When the computer program is executed in a computer, the computer is enabled to perform the steps of the above-mentioned method.

The above describes a schematic solution of the computer program in this embodiment. It is worthwhile to note that the technical solution of the computer program and the technical solution of the above-mentioned method belong to the same concept. For detailed content not described in detail in the technical solution of the computer program, references can be made to the descriptions of the technical solution of the above-mentioned method.

Specific embodiments of this specification are described above. Other embodiments fall within the scope of the appended claims. In some cases, the actions or steps described in the claims can be performed in a sequence different from that in the embodiments and desired results can still be achieved. In addition, the process depicted in the accompanying drawings does not necessarily need a particular sequence to achieve the desired results. In some implementations, multi-tasking and parallel processing are feasible or may be advantageous.

The computer instructions include computer program code. The computer program code can be in a source code form, an object code form, an executable file form, some intermediate forms, etc. The computer-readable medium can include any entity or apparatus that can carry the computer program code, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, etc. It is worthwhile to note that content included in the computer-readable medium can be appropriately added or subtracted according to a requirement of legislation and patent practices in a jurisdiction. For example, in some jurisdictions, the computer-readable medium does not include an electrical carrier signal or a telecommunication signal based on legislation and patent practices.

It is worthwhile to note that, for ease of description, the above method embodiments are described as a series of action combinations. However, a person skilled in the art should understand that the embodiments of this specification are not limited to the described action order, because according to the embodiments of this specification, some steps may be performed in another sequence or simultaneously. In addition, a person skilled in the art should also understand that the embodiments described in this specification are all preferred embodiments, and involved actions and modules are not necessarily required in the embodiments of this specification.

In the above-mentioned embodiments, the embodiments have respective focuses. For a part that is not described in detail in an embodiment, references can be made to the related description of other embodiments.

The above disclosed preferred embodiments of this specification are merely intended to help describe this specification. The optional embodiments do not describe all details, and do not limit the present invention to merely the specific implementations. Apparently, many modifications and changes can be made based on content of the embodiments of this specification. These embodiments are selected and specifically described in this specification, to better explain principles and actual applications of the embodiments of this specification, so that a person skilled in the art can better understand and use this specification. This specification is limited only by the claims and the scope and equivalents thereof.

The invention claimed is:

1. A data storage method, applied to a knowledge graph platform, and comprising:

splitting target knowledge graph data, to determine at least two pieces of to-be-stored target subgraph data, wherein the target knowledge graph data comprise a target entity node and at least one edge associated with the target entity node, and each piece of to-be-stored target subgraph data comprises the target entity node and an edge with at least one target attribute; and storing the at least two pieces of to-be-stored target subgraph data in at least two consecutive data blocks based on an edge attribute, wherein an end entity identifier of to-be-stored target subgraph data stored in a previous data block is the same as a start entity identifier of to-be-stored target subgraph data stored in a current data block.

2. The data storage method according to claim 1, wherein after storing the at least two pieces of to-be-stored target subgraph data in the at least two consecutive data blocks based on the edge attribute, the method further comprises:

recording index information in each data block, and determining index array information based on the index information in each data block, wherein the index information comprises a start entity identifier, an end entity identifier, and an edge attribute condition associated with the end entity identifier that are of to-be-stored target subgraph data stored in each data block.

3. The data storage method according to claim 2, wherein determining the index array information based on the index information in each data block comprises:

determining the start entity identifier and the end entity identifier of the to-be-stored target subgraph data in each data block; and in a case where it is determined that an end entity identifier and a start entity identifier that are adjacent in two consecutive data blocks are the same, processing index information in the two consecutive data blocks, to determine index array information, wherein entity identifiers in the index array information are arranged based on a storage sequence.

4. The data storage method according to claim 1, wherein splitting the target knowledge graph data, to determine the at least two pieces of to-be-stored target subgraph data comprises:

determining a splitting parameter, and splitting the target knowledge graph data based on the splitting parameter, to determine the at least two pieces of to-be-stored target subgraph data; and wherein, correspondingly, before splitting the target knowledge graph data, the method further comprises:

processing received to-be-processed data, to determine target entity data in the to-be-processed data and relational data associated with the target entity data; and determining a data structure of the to-be-processed data based on the target entity data and the relational data, and constructing the target knowledge graph data based on the data structure.

5. The data storage method according to claim 4, wherein storing the at least two pieces of to-be-stored target subgraph data in the at least two consecutive data blocks based on the edge attribute comprises:

determining an edge direction in the to-be-stored target subgraph data, and classifying edges in the to-be-stored target subgraph data based on the edge direction, to determine at least one edge type, wherein the edge direction comprises an out-edge direction and an in-edge direction, the out-edge direction is a direction pointing from the target entity node to another entity node, and the in-edge direction is a direction pointing from another entity node to the target entity node; and storing the at least two pieces of to-be-stored target subgraph data in the at least two consecutive data blocks based on the at least one edge type.

6. The data storage method according to claim 1, wherein the data block further comprises a buffer; and wherein, correspondingly, storing the at least two pieces of to-be-stored target subgraph data the in at least two consecutive data blocks based on the edge attribute comprises:

determining, from the to-be-stored target subgraph data, remaining data that cannot be stored in the at least two consecutive data blocks, and storing the remaining data in a buffer in an end data block in the at least two consecutive data blocks.

7. A computing device, comprising:

a memory and a processor, wherein the memory is configured to store computer-executable instructions, the processor is configured to execute the computer-executable instructions, and when the computer-executable instructions are executed by the processor the processor is caused to:

split target knowledge graph data, to determine at least two pieces of to-be-stored target subgraph data, wherein the target knowledge graph data comprise a target entity node and at least one edge associated with the target entity node, and each piece of to-be-stored target subgraph data comprises the target entity node and an edge with at least one target attribute; and store the at least two pieces of to-be-stored target subgraph data in at least two consecutive data blocks based on an edge attribute, wherein an end entity identifier of to-be-stored target subgraph data stored in a previous data block is the same as a start entity identifier of to-be-stored target subgraph data stored in a current data block.

8. The computing device according to claim 7, wherein after the at least two pieces of to-be-stored target subgraph data is stored in the at least two consecutive data blocks based on the edge attribute, the processor is further caused to:

record index information in each data block, and determine index array information based on the index information in each data block, wherein the index information comprises a start entity identifier, an end entity identifier, and an edge attribute condition associated with the end entity identifier that are of to-be-stored target subgraph data stored in each data block.

9. The computing device according to claim 8, wherein the processor is caused to determine the index array information based on the index information in each data block by being caused to:

determine the start entity identifier and the end entity identifier of the to-be-stored target subgraph data in each data block; and in a case where it is determined that an end entity identifier and a start entity identifier that are adjacent in two consecutive data blocks are the same, process index information in the two consecutive data blocks, to determine index array information, wherein entity identifiers in the index array information are arranged based on a storage sequence.

10. The computing device according to claim 7, wherein the processor is caused to split the target knowledge graph data, to determine the at least two pieces of to-be-stored target subgraph data by being caused to:

determine a splitting parameter, and split the target knowledge graph data based on the splitting parameter, to determine the at least two pieces of to-be-stored target subgraph data; and wherein, correspondingly, before the target knowledge graph data is split, the processor is further caused to:

process received to-be-processed data, to determine target entity data in the to-be-processed data and relational data associated with the target entity data; and determine a data structure of the to-be-processed data based on the target entity data and the relational data, and construct the target knowledge graph data based on the data structure.

11. The computing device according to claim 10, wherein the processor is caused to store the at least two pieces of to-be-stored target subgraph data in the at least two consecutive data blocks based on the edge attribute by being caused to:

determine an edge direction in the to-be-stored target subgraph data, and classify edges in the to-be-stored target subgraph data based on the edge direction, to determine at least one edge type, wherein the edge direction comprises an out-edge direction and an in-edge direction, the out-edge direction is a direction pointing from the target entity node to another entity node, and the in-edge direction is a direction pointing from another entity node to the target entity node; and store the at least two pieces of to-be-stored target subgraph data in the at least two consecutive data blocks based on the at least one edge type.

12. The computing device according to claim 7, wherein the data block further comprises a buffer; and wherein, correspondingly, the processor is caused to store the at least two pieces of to-be-stored target subgraph data the in at least two consecutive data blocks based on the edge attribute by being caused to:

determine, from the to-be-stored target subgraph data, remaining data that cannot be stored in the at least two consecutive data blocks, and store the remaining data in a buffer in an end data block in the at least two consecutive data blocks.

13. A non-transitory computer-readable storage medium, wherein the computer-readable storage medium stores computer-executable instructions, and when the computer-executable instructions are executed by a processor, the processor is caused to:

split target knowledge graph data, to determine at least two pieces of to-be-stored target subgraph data, wherein the target knowledge graph data comprise a target entity node and at least one edge associated with the target entity node, and each piece of to-be-stored target subgraph data comprises the target entity node and an edge with at least one target attribute; and store the at least two pieces of to-be-stored target subgraph data in at least two consecutive data blocks based on an edge attribute, wherein an end entity identifier of to-be-stored target subgraph data stored in a previous data block is the same as a start entity identifier of to-be-stored target subgraph data stored in a current data block.

14. The non-transitory computer-readable storage medium according to claim 13, wherein after the at least two pieces of to-be-stored target subgraph data is stored in the at least two consecutive data blocks based on the edge attribute, the processor is further caused to:

record index information in each data block, and determine index array information based on the index information in each data block, wherein the index information comprises a start entity identifier, an end entity identifier, and an edge attribute condition associated with the end entity identifier that are of to-be-stored target subgraph data stored in each data block.

15. The non-transitory computer-readable storage medium according to claim 14, wherein the processor is caused to determine the index array information based on the index information in each data block by being caused to:

determine the start entity identifier and the end entity identifier of the to-be-stored target subgraph data in each data block; and in a case where it is determined that an end entity identifier and a start entity identifier that are adjacent in two consecutive data blocks are the same, process index information in the two consecutive data blocks, to determine index array information, wherein entity identifiers in the index array information are arranged based on a storage sequence.

16. The non-transitory computer-readable storage medium according to claim 13, wherein the processor is caused to split the target knowledge graph data, to determine the at least two pieces of to-be-stored target subgraph data by being caused to:

determine a splitting parameter, and split the target knowledge graph data based on the splitting parameter, to determine the at least two pieces of to-be-stored target subgraph data; and wherein, correspondingly, before the target knowledge graph data is split, the processor is further caused to:

process received to-be-processed data, to determine target entity data in the to-be-processed data and relational data associated with the target entity data; and determine a data structure of the to-be-processed data based on the target entity data and the relational data, and construct the target knowledge graph data based on the data structure.

17. The non-transitory computer-readable storage medium according to claim 16, wherein the processor is caused to store the at least two pieces of to-be-stored target subgraph data in the at least two consecutive data blocks based on the edge attribute by being caused to:

determine an edge direction in the to-be-stored target subgraph data, and classify edges in the to-be-stored target subgraph data based on the edge direction, to determine at least one edge type, wherein the edge direction comprises an out-edge direction and an in-edge direction, the out-edge direction is a direction pointing from the target entity node to another entity node, and the in-edge direction is a direction pointing from another entity node to the target entity node; and store the at least two pieces of to-be-stored target subgraph data in the at least two consecutive data blocks based on the at least one edge type.

18. The non-transitory computer-readable storage medium according to claim 13, wherein the data block further comprises a buffer; and wherein, correspondingly, the processor is caused to store the at least two pieces of to-be-stored target subgraph data the in at least two consecutive data blocks based on the edge attribute by being caused to:

determine, from the to-be-stored target subgraph data, remaining data that cannot be stored in the at least two consecutive data blocks, and store the remaining data in a buffer in an end data block in the at least two consecutive data blocks.

\* \* \* \* \*